United States Patent [19]

Schuster

[11] Patent Number: 4,752,350
[45] Date of Patent: Jun. 21, 1988

[54] DEVICE FOR MAKING WELDED CORNER JOINTS

[75] Inventor: Helmut Schuster, Holzgünz-Schwaighausen, Fed. Rep. of Germany

[73] Assignee: Firma Urban GmbH & Co. Maschinenbau KG, Memmingen, Fed. Rep. of Germany

[21] Appl. No.: 929,839

[22] Filed: Nov. 13, 1986

[30] Foreign Application Priority Data

Apr. 30, 1986 [DE] Fed. Rep. of Germany ....... 3614673

[51] Int. Cl.$^4$ .................. B29C 65/00; B29C 65/02; B29C 65/18
[52] U.S. Cl. .................. 156/379.6; 156/258; 156/304.2; 156/304.5; 156/304.6; 156/308.2; 156/309.6; 156/379.8; 156/499; 219/78.01; 219/221; 219/243
[58] Field of Search ............... 156/304.2, 304.5, 304.6, 156/258, 379.6, 379.8, 308.2, 309.6, 499; 52/726, 309.1; 138/155; 219/243, 221, 57, 78.01

[56] References Cited

U.S. PATENT DOCUMENTS

| 2,886,482 | 5/1959 | Huffman | 156/258 X |
| 2,972,371 | 2/1961 | Hermann et al. | 156/499 |
| 3,013,925 | 12/1961 | Larsen | 156/499 X |
| 3,853,655 | 12/1974 | Pecha | 156/308.2 X |
| 3,855,038 | 12/1974 | Anschutz | 156/304.2 X |
| 4,239,574 | 12/1980 | Aust et al. | 156/499 X |
| 4,390,384 | 6/1983 | Turner | 156/309.6 X |

Primary Examiner—Jerome Massie
Assistant Examiner—Jeff H. Aftergut
Attorney, Agent, or Firm—Holman & Stern

[57] ABSTRACT

In the manufacture of welded corner joints between hollow plastic sections shaped parts are used which abut against the plastic sections during the heating-up operation and also during the welding process. In this way the result is achieved that the weld bead or plastic rim which forms during the welding, is pressed into the hollow cavity (19) or into the hollow cavities so that a subsequent operation for the purpose of removing the weld bead is not necessary.

10 Claims, 4 Drawing Sheets

DEVICE FOR MAKING WELDED CORNER JOINTS

The invention relates to a method for making welded corner joints between hollow plastic sections, for example for making window frames and to a device for carrying out the method.

When window frames, door frames or frames for other purposes, for instance picture frames made of plastic sections, are welded together, the welded joints are produced by the sections which are to be joined being cut first of all to a mitre, for example with an angle of 45°. In a suitable machine the surfaces to be welded are then pressed against a welding plate, that is, against a plate-like element which is heated from inside. This welding plate heats the ends of the plastic sections to such an extent that they become soft. Since the plastic section is pressed against the welding plate deformation of the plastic materials occurs and the ends of the sections tend to mushroom out.

Deformation of the plastic sections also occurs during the welding operation itself which is carried out after removal of the welding plate. Here too a deformation of the heated plastic materials occurs. In this way, after cooling, a rim or weld bead is left on the finished window frame which has to be removed in a subsequent working operation. Removal is necessary on the one hand for visual reasons, on the other hand a weld bead such as this would be a nuisance during use because the weld bead or plastic rim would project over the outer surface of the sections.

The subsequent removal of the weld beads presents an undesired, additional working operation; furthermore, trimming off the weld bead does not in all cases succeed perfectly.

Milling cutters or blades may for instance be used for removing the weld bead.

It has already been suggested that the occurrence of such weld beads should be prevented or suppressed from the start, more particularly by blade-like elements being pressed against the weld bead from both sides during the welding process, said elements slicing off, more or less, said bead. The effects of such measures are however also only partially satsifactory. For complete avoidance of bead, the appliances must work very precisely. However, even then part of the bead often remains.

The object of the invention is to provide method and a device with which it is possible to reduce the cost of making welded corner joints of the present type said cost being due to the formation of weld beads, with the aim of creating a product with good service properties and an attractive external appearance.

The invention therefore provides a method for making welded corner joints between hollow plastic sections, for example for making window frames, where the sections which have been cut to a mitre are first of all heated on a heated welding plate and then, after removal of the welding plate, are pressed against one another with the heated surfaces, whereby the sections weld together, wherein during the heating-up operation, and also during the welding process, shaped parts, which have been adapted to the outer contour of the plastic sections and which prevent the softened plastic from seeping outwards, lie against appropriate parts of the heated area of the plastic sections in direct contact with the welding plate.

The invention further provides a device for making welded corner joints between hollow plastic sections suitable for use as window frames, comprising a welding framework, a welding plate removably supported in the welding framework, means to move the plate into and out of an operating position in the framework, and shaped parts, contoured to co-operate with the shape of the plastic sections to be welded in the region of mitred surfaces thereof, the welding plate and the shaped parts together defining an envelope substantially to enclose end portions of the plastic sections including the surfaces to be welded.

In contrast to the known proposals, the invention is not involved with the removal of a weld bead already formed or the weld rim made of plastic material. The invention provides rather that the formation of a weld bead such as this be suppressed from the start. By virtue of the fact that shaped parts lie against the plastic section during the heating-up process it is ensured that the softened plastic does not seep out. Since the sections are hollow sections the plastic is increasingly pressed inwards while the outer contour of the plastic sections remains essentially unchanged.

After removal of the welding plate and during the welding operation the shaped parts stay in position on the outer contour of the plastic section and even when these are pressed together for the purpose of bonding they prevent a formation of weld beads. After cooling and removal of the shaped parts a product is obtained which requires no further finishing work on the faces on which the shaped parts were operative. The weld beads on the inside of the hollow areas do not present a problem.

It has been found that weld joints in accordance with the method described by the invention have essentially the same strength as conventional weld joints. In some cases the strength of the weld joint is somewhat reduced through the measures described by the invention; this is because in the outer areas of the weld the original surfaces of the plastic sections are pressed together, said surfaces perhaps not having been heated as well as the inner areas. Furthermore, when the plastic sections are made a skin forms on them which produces welds weaker than the material on the inside of the plastic sections. The reduction of the strength can however, as a rule, be accepted without further ado especially since the plastic material or plastic ridges which are forced inside the hollow sections weld together there in relatively large cross-sectional areas, through which any reduction in strength is partially balanced out.

The device described by the invention for carrying out the method has the characteristic that the welding reflector and the shaped parts together substantially envelop the outer contour of the plastic sections including the surfaces to be welded. This results in the plastic material not being able to seep out during heating.

The device described by the invention can be realised in two different forms. In one embodiment of the invention a flat welding plate of more or less conventional design is used which extends sufficiently over the cross section of the plastic sections. During the heating up process the plastic sections, and also the shaped parts which surround the plastic sections to a sufficient extent, lie against this welding plate on both sides. After removal of the welding plate the shaped parts are brought together against each other at both sides and the welding is then carried out, whereby the plastic sections mover relative to one another.

It is however better if, as the invention further proposes, a welding plate is used which is shaped such that its outlines match the outline of the plastic sections. With this design shaped parts can be used which coordinate with both ends of the plastic sections to be welded. During the welding operation the shaped parts do not have to be moved relative to on another.

This embodiment form does however require a guide for the welding plate which projects outwardly and by means of which the welding plate can be held and moved away. For this invention proposes, in particular, that the guide for the welding plate be associated with an essentially flat external face and/or the external corner of the plastic sections which are to be welded.

In the region of this guide the shaped parts as described by the invention are therefore not used or only to a limited degree, so that an externally lying weld bead will possibly form here. However, if this rim is located on a flat surface removal presents only minor difficulties. The same applies if the rim forms on the outer corner because it can be removed quickly and accurately here, with a single working operation, for example by a milling operation.

This and further advantageous embodiment forms of the invention can be seen from the features of the subsidiary claims.

There will now be described several examples of the invention. It will be understood that the description which is to be read with reference to the drawings is given by way of example only and not by way of limitation.

Figure 1:
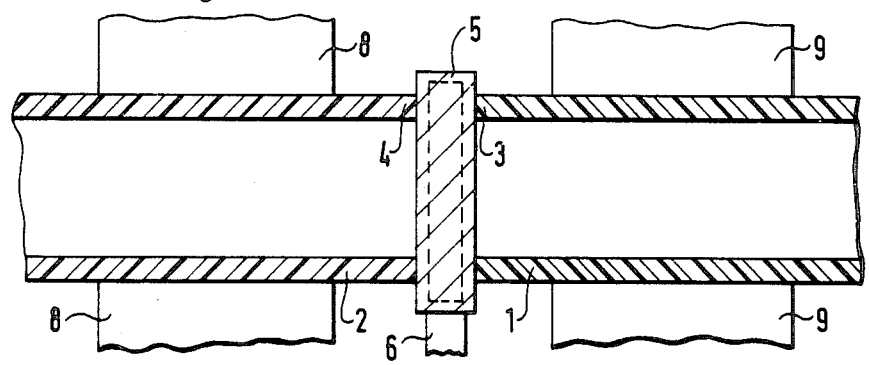
FIGS. 1 to 4 show various consecutive stages of the method previously used for making welded corner joints between plastic sections.

FIGS. 1 to 7 show respectively sectional views perpendicular to the plane of the window frame, from which the manufacture of a corner joint is shown. Here, the plastic sections which are to be joined together are usually provided with a mitre of 45° so that a corner joint with a right angle is obtained. This is however only to be understood by way of example. The invention can be used if the corner joint presents other angles, for example of 60°. The invention is also applicable if a transom is to be welded into a window frame, that is, if a T-shaped joint is to be made.

The FIGS. 1 to 4 show the conventional prior art method. The two plastic sections 1 and 2 which lie in one plane, lie with their ends 3 and 4 against the heated welding plate 5, the guide or holder of which is designated with 6. The sections are guided, or held, by clamps, fixing devices or similar framework, 8 and 9, and are pressed against each other in the direction of the arrows 7. Because the welding plate 5 is heated the ends 3 and 4 respectively (see FIG. 2) become heated and under the effect of the pressure with which the plastic sections 1 and 2 are pressed against the welding plate 5, the ends 3 and 4 swell apart in a mushroom or bead-like manner.

The welding plate 5 is now removed and the sections 1 and 2 are pressed against one another so that the weld 12 forms. The weld bead or the plastic rim 10 which seeps outwards is removed subsequently using suitable means, for example by means of the blades 11, or by a milling cutter 22. The part 13 of the weld bead which is pressed into the hollow cavity 14 of the plastic sections remains unaltered here.

Figure 4:
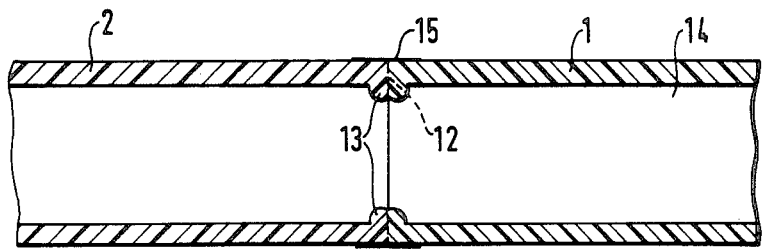

FIG. 4 shows a finished weld joint using the conventional method. In areas 15 remains of the weld bead, or traces of the machining operation, often occur.

Figure 5:
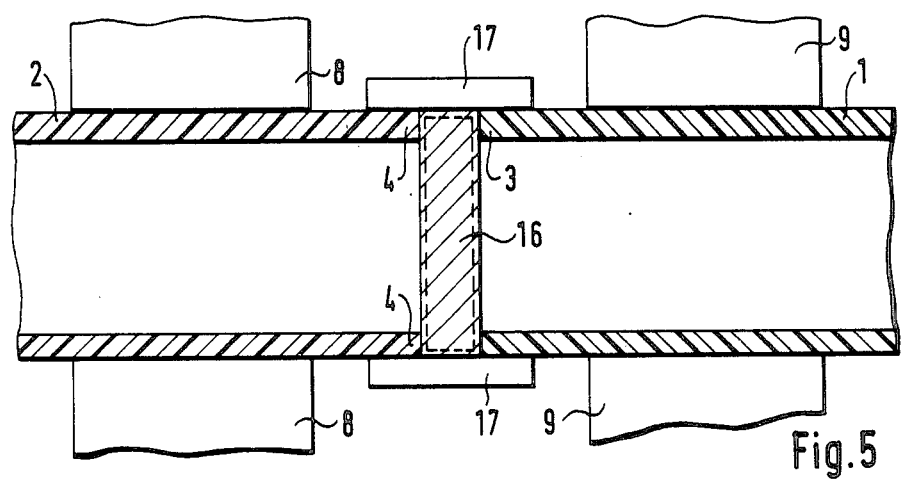
FIGS. 5 to 7 show the main steps of the method acording to the invention using the device of the invention.
Figure 6:
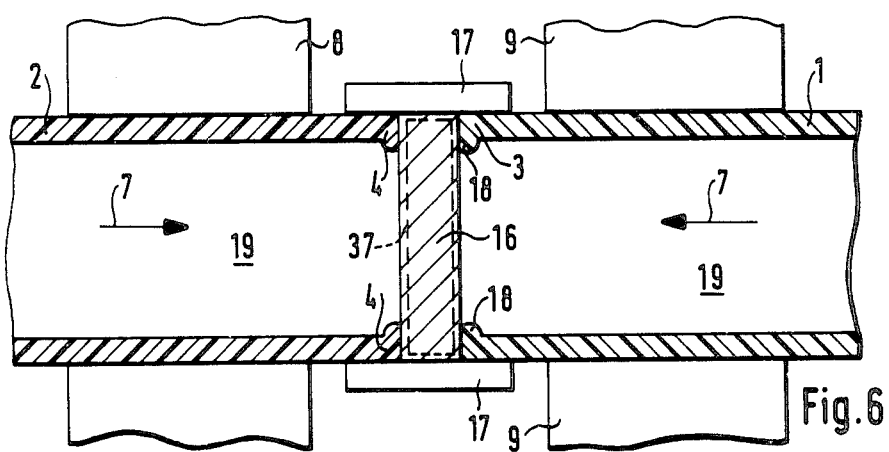
Figure 7:
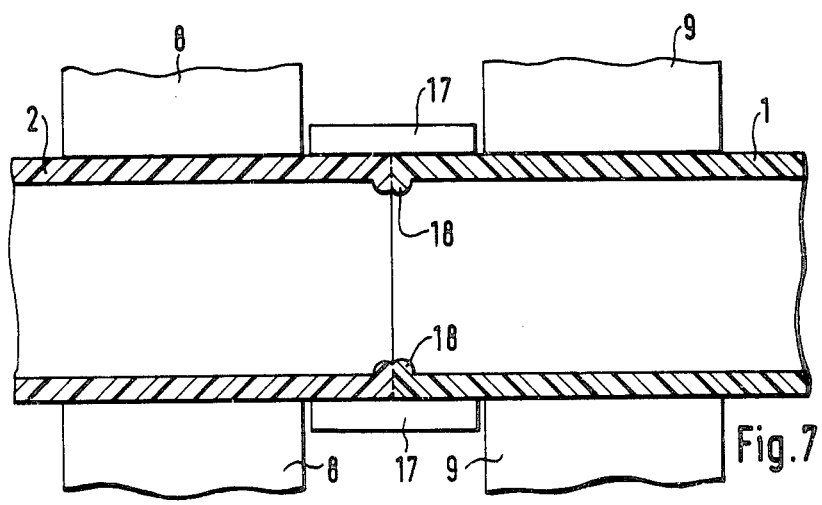

The method described by the invention is shown in diagrammatic form in FIGS. 5 to 7. The plastic sections 1 and 2 which abut with their ends 3 and 4 on the welding plate 16 are covered on their external surfaces by the shaped parts 17. The shaped parts 17 here are adapted to match the outer contour of the plastic sections 1 and 2. The shaped parts 17 can for instance here only abut against certain external faces, but they can also completely envelop the ends 3 and 4 of the plastic sections 1 and 2.

The welding plate 16 is appropriately designed as regards its outer outline and is also adapted to the outer contour of the plastic sections.

After the heating operation (FIG. 6) the ends 3 and 4 of the plastic sections 1 and 2 form beads 18 on the welding plate, however, as long as the shaped parts 17 are provided, said beads can only extend into the hollow cavities 19 of the plastic sections 1 and 2.

In the next working operation the welding plate 16 is removed, for which purpose one external surface of the plastic sections 1 and 2, for example, remains uncovered by shaped parts 17 and the plastic sections 1 and 2 are pressed against each other so that a weld 12 is obtained. This is shown in FIG. 7.

During this welding process the covering position and the position of the shaped parts 17 preventing the formation of weld beads remains maintained.

Figure 2:
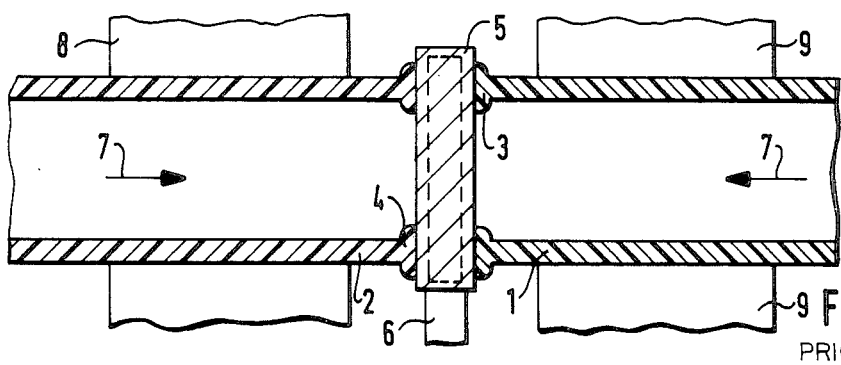
Figure 3:
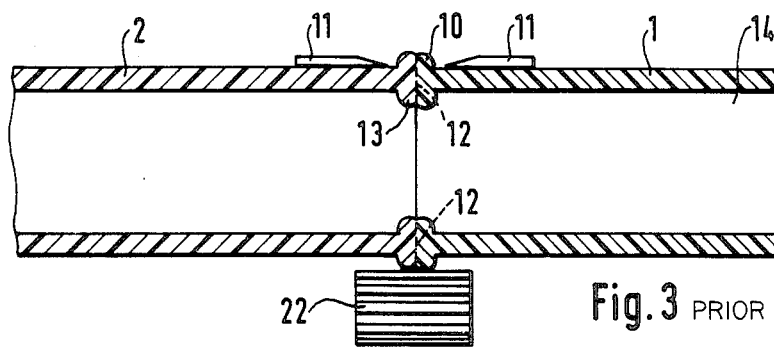

During the method described by the invention the plastic sections 1 and 2 are held and guided, in a similar manner, by clamps, fixing devices or similar devices 8 and 9, as has been described in connection with the embodiment examples shown in FIGS. 1 and 2.

Figure 8:
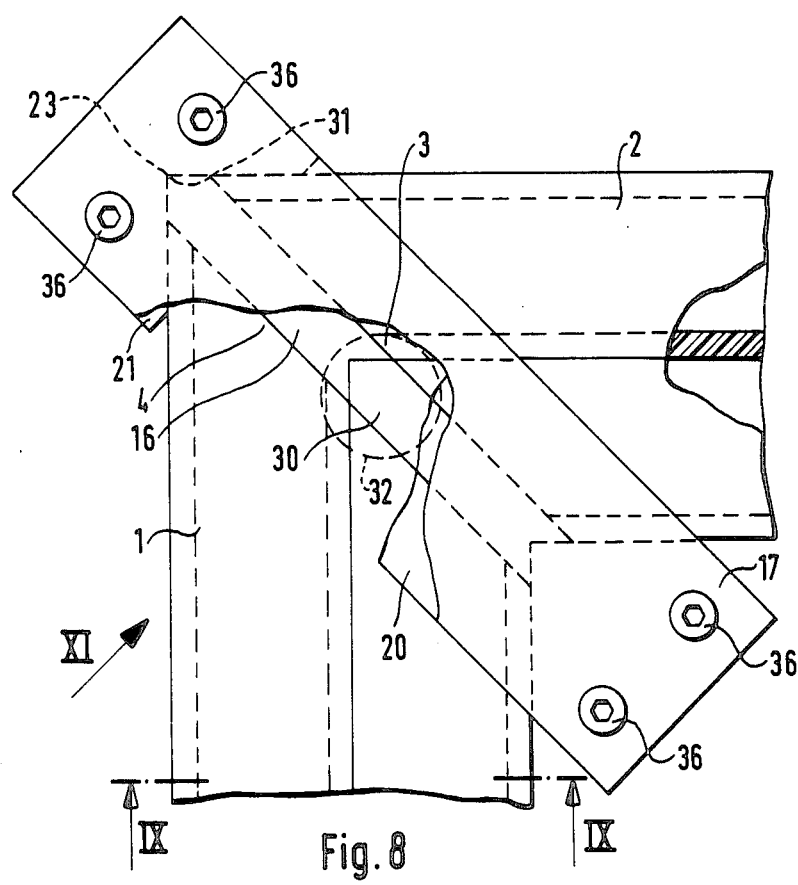
FIG. 8 shows a plan view of a device according to the invention.

FIG. 8 shows a plan view of a corner joint, during manufacture. The plastic sections which have a shape as shown by way of example in FIG. 9, lie against the welding plate 16. Several shaped parts 20, 17 and 21 are provided which surround the corner joint like a frame or in a U-shape. These shaped parts are connected together by the screws 36. The shaped part 21 has an interengaging means in the form of a V-shaped or right-angled groove 23 to fit on to the outer corner of the abutting plastic sections, or also on to the corresponding shape of the welding plate 16.

The shaped part 20 is provided with a step 24 which matches the step 25 of the plastic sections and further, the shaped part 20 is designed like a wedge on the inner edges 26 and 27 so that these edges 26 and 27 match the inner corner of the corner joint of the plastic sections 1 and 2 and also the shape of the welding plate 16.

Figure 10:
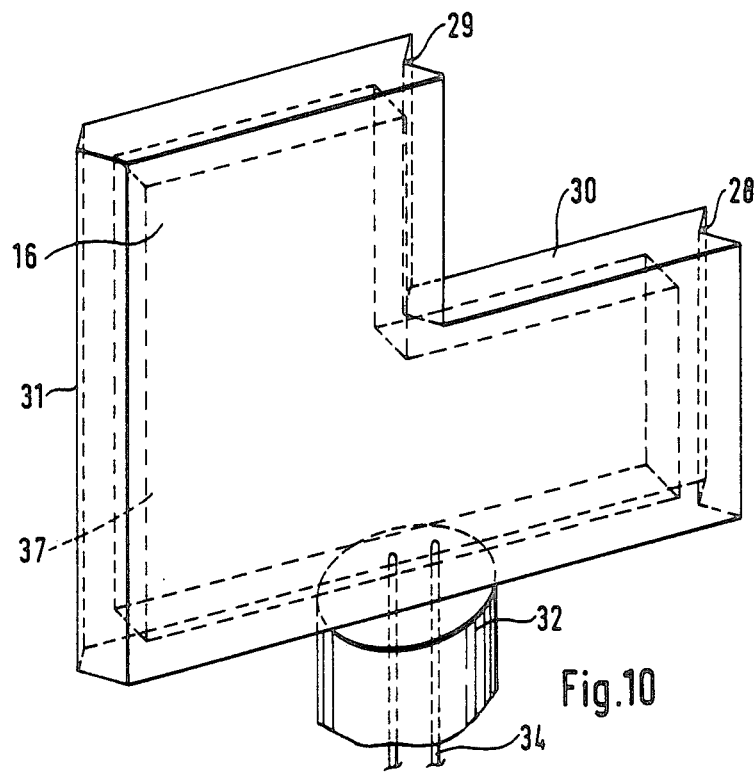
FIG. 10 shows a perspective view of an embodiment of a welding reflector for a device according to the invention.

The shape of this welding plate can be seen from the diagram in FIG. 10.

The welding plate is provided with a step 30 to match the step 24 and 25 of the shaped part 20 or of the plastic sections 1 and 2. The edge 31 is provided with a knife edge which matches the groove 23 of the shaped part 21, while on the other side the welding plate 16 has grooves 28 and 29 which in turn fit the edges 26 and 27.

The welding plate 16 is held by a guide 32 which is disposed on the side on which the plastic sections 1 and 2 have a flat surface 33.

On the inside of the welding plate 16 an electric heating device 37 is provided, the supply cables 34 of which run in the guide 32.

The shaped parts 20, 17 and 21 can also be provided with an electric heating device such as this, as indicated with 35 in the shaped part 21. This heating device is not indicated in the shaped parts 20 and 17.

A heating device is not absolutely necessary for the shaped parts. If the shaped parts are designed such that the heat insulating effect is sufficient the result will be that the material of the plastic sections 1 and 2 which abuts on the shaped parts is not cooled to any extent worth mentioning so that it is not necessary to heat the shaped parts.

Figure 9:
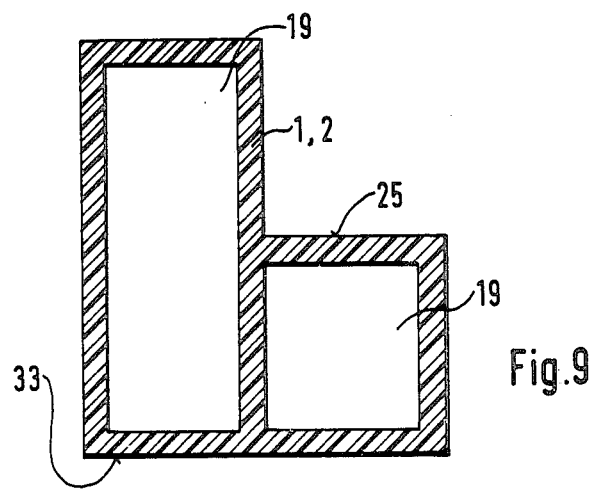
FIG. 9 shows a sectional view of the plastic section as used in the embodiment shown in FIG. 8, taken along section line IX—IX in FIG. 8.
Figure 11:
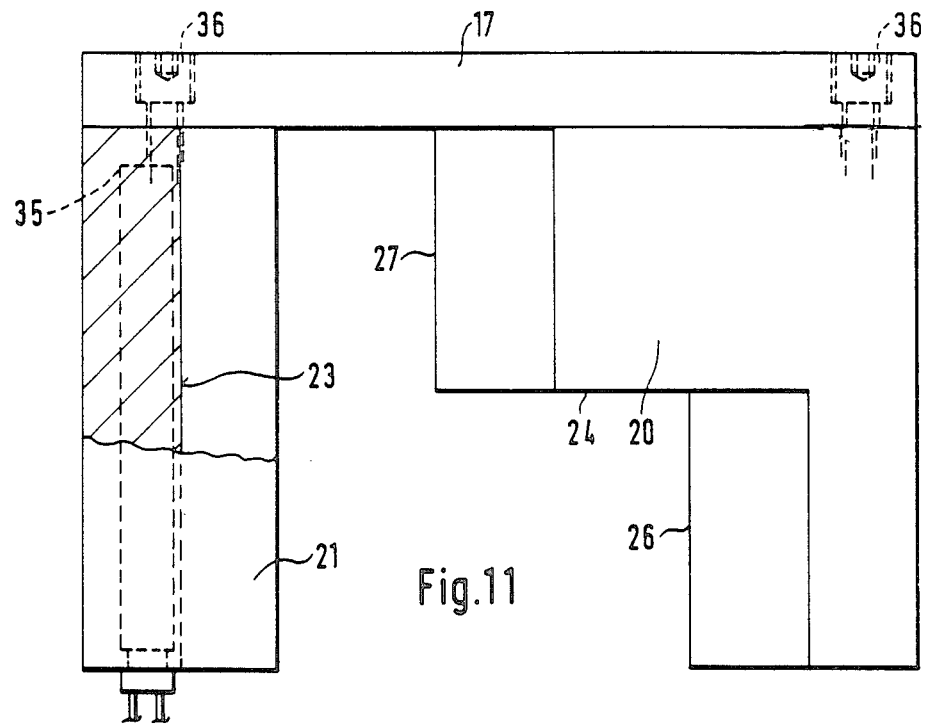
FIG. 11 shows a view of one part of a device as described by the invention, taken approximately in the direction of the arrow XI in FIG. 8.

The plastic section which is shown in FIG. 9 has a very simple shape.

The sections from which window frames, door frames or similar objects are made are usually of more complicated design and the shaped parts which co-operate with the corresponding outer faces of these plastic sections have to be adapted to this shape. The shaped parts can be made of metal and should where necessary, be coated with suitable materials such as polytetrafluoroethylene, or the like. The shaped parts can however also be made of plastic materials whereby materials with which softening in the temperature range used is not to be feared are to be preferred.

I claim:

1. A device for making welded corner joints between hollow plastic sections suitable for use as window frames, comprising a welding framework, and welding plate removably supported in the welding framework, means to move the plate into and out of an operating position in the framework, and shaped parts, contoured to co-operate with the shape of the plastic sections to be welded in a region of mitred surfaces thereof, the welding plate and the shaped parts together defining an envelope substantially to enclose end portions of the plastic sections including the surfaces to be welded wherein the weld joint has an inner corner and the shaped parts associated with the inner corner of the weld joint are shaped like a wedge.

2. Device as claimed in claim 1, wherein the welding plate is shaped such that its outlines match outlines of the plastic sections.

3. Device as claimed in claim 2 wherein the shaped parts are provided with a heating device.

4. Device as claimed in claim 1, wherein the means to move the plate includes a guide which is associated with an essentially flat outer face of the plastic sections to be welded.

5. Device as claimed in claim 4, wherein the shaped parts together have a U-shaped formation and surround the weld on three sides, while the guide of the welding plate is disposed on the fourth side.

6. A device for making welded corner joints between hollow plastic sections suitable for use as window frames, comprising a welding framework, and welding plate removably supported in the welding framework, means to move the plate into and out of an operating position in the framework, and shaped parts, contoured to co-operate with the shape of the plastic sections to be welded in a region of mitred surfaces thereof, the welding plate and the shaped parts together defining an envelope substantially to enclose end portions of the plastic sections including the surfaces to be welded wherein the weld joint has an outer corner and the shaped parts associated with the outer corner of the weld joint have interengaging means in the form of grooves.

7. The device as claimed in claim 6 wherein the shaped parts are provided with a heating device.

8. The device as claimed in claim 6 wherein the welding plate is shaped such that its outlines match outlines of the plastic sections.

9. The device as claimed in claim 6 wherein the means to move the plate includes a guide which is associated with an essentially flat outer face of the plastic sections to be welded.

10. The device as claimed in claim 9 wherein the shaped parts together have a U-shaped formation and surround the weld on the three sides, while the guide of the welding plate is disposed on the fourth side.

* * * * *